US012803935B2

(12) United States Patent
Kapadia et al.

(10) Patent No.: US 12,803,935 B2
(45) Date of Patent: Nov. 17, 2026

(54) MINIMIZING RETRIES IN A COHERENT FABRIC

(71) Applicant: Microsoft Technology Licensing, LLC, Redmond, WA (US)

(72) Inventors: Bezan Jamshed Kapadia, Hillsboro, OR (US); Nishigandha Sanjay Pawar, Hillsboro, OR (US); Dhawal Krishana Gupta, Hillsboro, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 18/892,756

(22) Filed: Sep. 23, 2024

(65) Prior Publication Data

US 2026/0089126 A1 Mar. 26, 2026

(51) Int. Cl.
*H04L 49/9005* (2022.01)

(52) U.S. Cl.
CPC ................................ *H04L 49/9005* (2013.01)

(58) Field of Classification Search
CPC ............... H04L 49/9005; H04L 47/625; G06F 15/17325; G06F 15/17381; G06F 15/7807; G06F 15/7825
See application file for complete search history.

(56) References Cited

U.S. PATENT DOCUMENTS

| | | | | |
|---|---|---|---|---|
| 7,424,566 B2 * | 9/2008 | Manula | G06F 13/423 | 710/310 |
| 8,463,958 B2 * | 6/2013 | Mannava | G06F 13/364 | 710/52 |
| 9,130,881 B2 * | 9/2015 | Jones | G06F 9/5005 | |
| 2005/0120360 A1 * | 6/2005 | Makhervaks | H04L 67/1097 | 719/321 |
| 2007/0112995 A1 * | 5/2007 | Manula | G06F 13/423 | 710/310 |
| 2013/0042032 A1 * | 2/2013 | Mannava | G06F 13/364 | 710/52 |
| 2013/0232269 A1 * | 9/2013 | Jones | G06F 9/5005 | 709/226 |
| 2016/0357702 A1 * | 12/2016 | Shamis | G06F 15/167 | |
| 2024/0069805 A1 * | 2/2024 | Dugan | G06F 3/0604 | |

OTHER PUBLICATIONS

International Search Report and Written Opinion received for PCT Application No. PCT/US2025/037451, mailed on Nov. 24, 2025, 14 pages.

* cited by examiner

*Primary Examiner* — Abdullahi E Salad
(74) *Attorney, Agent, or Firm* — Seed Intellectual Property Law Group LLP

(57) ABSTRACT

The described technology provides a method that may be implemented at one of a destination node or a home node (also referred to as a completer node), the method including receiving a transaction request at a destination node of a fabric, determining if a request queue (RQ) of the destination node is full, in response to determining that the RQ is full, determining if a retry command buffer (RCB) is full, in response to determining that the RCB is not full, determining if a number of backlogged transaction requests (RetryRsp count) in a RetryRsp counter is zero, and in response to determining that the RetryRsp count is zero, adding the transaction request to the RCB.

20 Claims, 8 Drawing Sheets

MINIMIZING RETRIES IN A COHERENT FABRIC

BACKGROUND

Modern computing networks, including cloud networks, include mesh of large number of processors, servers, storage networks, etc., to support free-flowing traffic with minimal traffic congestion. Such mesh networks typically use coherent fabric on the mesh using a coherent fabric protocol between sender/source/requestor nodes and receiver/destination/completer node of packets. Under coherent fabric protocol, when a packet goes to a destination, the destination can either consume the packet or if the destination is not able to consume the packet it may send feedback to the source saying that the destination is not able to consume the packet. Typically, such feedback may also include a message to the source that the destination is going to contact the source at some later point in time to request resending the packet and that at that time, the destination guarantees the source that it will consume the packet when it resent back to the destination.

SUMMARY

The described technology provides a method that may be implemented at one of a destination node or a home node (also referred to as a completer node), the method including receiving a transaction request at a destination node of a fabric, determining if a request queue (RQ) of the destination node is full, in response to determining that the RQ is full, determining if a retry command buffer (RCB) is full, in response to determining that the RCB is not full, determining if a number of backlogged transaction requests (RetryRsp count) in a RetryRsp counter is zero, and in response to determining that the RetryRsp count is zero, adding the transaction request to the RCB.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
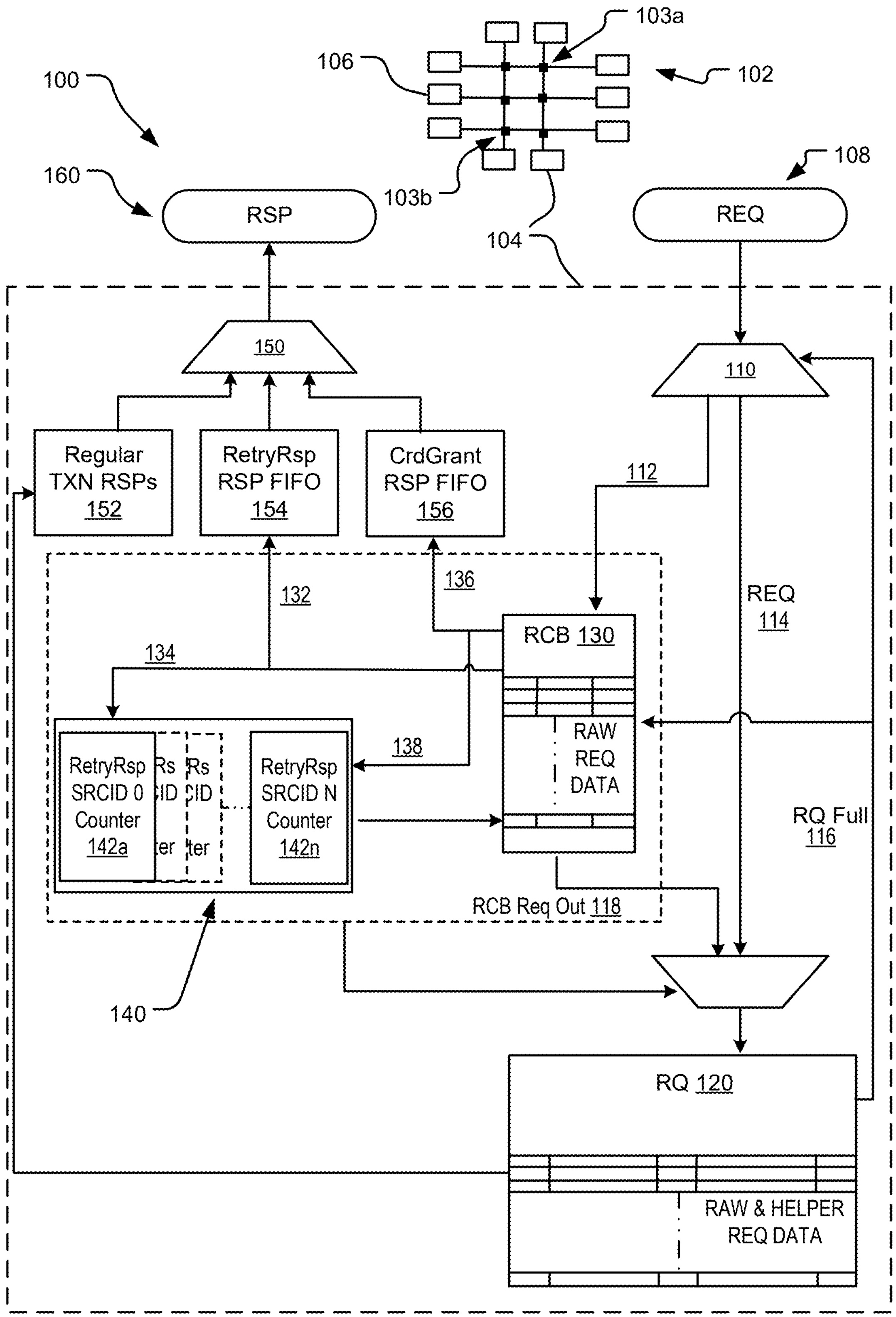
FIG. 1 illustrates an example implementation of a system for minimizing retries in a coherent fabric.

Coherent fabric architectural specification provides for a requester (like cores, PCIE devices) that originate commands and a completer (like memory controllers, PCIE devices) that service commands interconnected by a coherent fabric connecting all requesters and completers. Because the coherent fabric connects multiple requesters and completers, where any given requester can be sending commands to any given completer, it is imperative that transactions between a particular requester and a completer do not create any kind of congestion in the fabric that blocks transactions between some other requester and completer. To mitigate this congestion and back pressure throughout the fabric, coherent fabric architectural specifications define a request retry mechanism that ensures when a request reaches a completer, it is either accepted or the completer gives a retry response (RetryRsp) back to the requester to indicate to the requester that it is not able to accept the request and to prevent congestion in the fabric request channel. For example, the completer may not be able to accept a request when it has limited resources and insufficient storage to hold the current request until some earlier transactions have been completed.

The technology disclosed herein discloses implementations of a network-on-chip (NoC) interconnect between various hardware modules on a system-on-chip (SoC). Specifically, the NoC interconnect may operate as a coherent fabric between various cores and/or processors, memory controllers, and other devices, located on the SoC. For example, an implementation of the NoC disclosed herein may include one or more sender or originators, originating a request to a completer/destination node. Here the source node may be a core, or a processor and the destination node may be, for example, a memory controller. Both the source node and the destination node may be configured on an SoC with a number of intermediate nodes, referred to herein as home node or a completer node, configuring a coherent fabric NoC on the SoC.

When required resources become available, at a later point in time, the completer may then send a credit back to the requester through the response channel, using a credit grant response (CrdGrant). The CrdGrant response indicates to the requester that the transaction can be retried, and the requester sends the request back to the completer. When the completer sends the CrdGrant it guarantees that when the requester resends the request, the resent request will be accepted by the completer. The completer in this case must guarantee a dedicated storage spot to accept the request when it shows up a second time from the requestor. Therefore, it can be seen that the request to response loop between the requester to the completer is incurred twice to process the same request when a particular request is retried. In addition, there is overhead of the completer sending a RetryRsp and then eventually CrdGrant back to the requester to resend the request that was not processed before.

In systems with large coherent fabrics, many cores, home nodes, memory controllers and devices attached to the coherent fabric, there can be a large penalty incurred in latency, power, and performance when requests are being retried.

Implementations disclosed herein allows the completer to use a common storage structure to dynamically store retried commands as well as new commands and as a net result minimizes the number of retries in the system enabling better power, performance, and total cost of operation. Specifically, as illustrated In FIG. 1, the implementation at a completer includes a retry command buffer (RCB) and a request queue (RQ) and implements a method of minimizing retries using the RCB and the RQ. Specifically, FIG. 1 illustrates a system 100 for minimizing retries at a completer 104. For the discussion below, the completer 104 may also be referred to as a completer node 104, a receiver 104, or a destination 104. An example of the completer 104 may be a memory controller.

The coherent fabric 102 may be implemented on an SoC as a NoC where each of the sender nodes 106, the home nodes 103, and the completer node 104 may be hardware components located on the SoC. Examples of the sender nodes 106 may be a core or a processor and example of a completer node 104 may be a memory controller. The coherent fabric 102 may provide chip-to-chip interconnection between the sender nodes 106, the home nodes 103, and the completer node 104 in the form of a packet switching network. Specifically, each of the one or more functionalities disclosed herein with respect to the coherent fabric 102 and the operations implemented on one or more of the sender nodes 106, the home nodes 103, and the completer node 104 may be implemented as hardware or firmware implemented functionalities of the NoC coherent fabric 102. Furthermore, the implementation of the coherent fabric 102 may also provide scalable coherent interface (SCI) between one or more of the sender nodes 106, the home nodes 103, and the completer node 104 implemented on an SoC.

The completer 104 may include a request queue (RQ) 120, a retry command buffer (RCB) 130, a retry counter 140, and various logic blocks to implement the method of minimizing retry attempts in a coherent fabric that is the part of the completer 104. The completer 104 may be part of a coherent fabric 102 that may include a number of nodes including a requester 106. The coherent fabric 102 may also include a number of intermediate nodes such as node 103*a*, 103*b*, etc., which are referred to herein as home node or a completer node 103. One or more components or methods disclosed herein on the completer 104 may also be configured on the home node or a completer node 103. For the discussion below, the sender 106 may also be referred to as a sender node 106, a requester 106, or a source 106. An example of the requester 106 may be a core that requests a read or write to a memory. The RQ 120 may be a main processing queue at the completer 104 that is used to store and process commands and send responses back to the requester 106 based on coherent fabric architectural specifications. The RCB 130 may be used to provide dedicated storage for retried transaction requests received at the completer 104 when the RQ 120 runs full and the completer 104 issues a RetryRsp for not being able to accept the request followed by a CrdGrant when the completer 104 is able to reserve a spot for a transaction request for which it has already sent a RetryRsp.

The completer 104 may receive a command 108. For example, the transaction request 108 may be a request for reading data, writing data, or for performing some other operation by the completer 104. A transaction router 110 may send a request 114 to the RQ 120 to determines if there is any space in the RQ 120 for the command 108. If the RQ 120 not full, the transaction request 108 is routed to the RQ 120 for scheduling and a regular response is sent to the requester via a regular transmission response FIFO 152.

If the RQ 120 is full as per a response 116, the transaction router 110 may determine if the RCB 130 is full. If the RCB 130 is not full, the retry counter 140 is evaluated to see if the number of backlogged transaction requests (RetryRsp count) in the RetryRsp counter 140 is zero. If the number of backlogged transaction requests (RetryRsp count) in the RetryRsp counter 140 is zero, at 112 the command 108 is added to the RCB 130 and at 136 a CrdGrant response is added to a CrdGrant response FIFO buffer 156.

Specifically, each entry in the RCB 130 may correspond to one CrdGrant that the completer 104 reserves before it sends back the CrdGrant back to the requester 106 so when the retried command for the original command 108 is sent back from the requester 106 to the completer 104, there is a reserved storage entry to accept the retried command. In the illustrated implementations disclosed herein, in additional to being used as a dedicated storage for retried commands, the RCB 130 may also be used as a staging and storage queue for new commands 108 that have never been retried when the RQ 120 is full. Such ability to use the RCB 130 as a storage element for new commands 108 that have never been retried before enables the completer 104 to temporarily host new commands into RCB 130 as compared to doing the entire request retry flow. Therefore, the illustrated implementation of the completer 104 reduces the additional latency, power, and performance costs associated with doing the request retry flow for the commands 108 that are stored in the RCB 130 when the RQ is full and the number of backlogged transaction requests (RetryRsp count) in a RetryRsp counter is zero.

The RCB 130 tracks all the RetryRsps sent back 132 to each requester with RetryRsp SrcID counter 140 for each source represented by SrcID. Specifically, the RCB 130 tracks all the RetryRsp sent back to each requester with the dedicated RetryRsp counter 140 for each source represented by SrcID. Thus, the RetryRsp SrcID counter 140 increments when a RetryRsp is sent to the requester and decrements when an entry in the RCB 130 is reserved and a CrdGrant is sent back to the requester to resend the original request back to the completer.

In the illustrated implementation, the RetryRsp responses may be communicated to the requester via a RetryRsp FIFO 154. Here, as indicated by 134, the RetryRsp SrcID counter 140 is incremented when a RetryRsp is sent to the requester, such as the requester 106. Similarly, as indicated by 138, the RCB 130 decrements the RetryRsp SrcID counter 140 when an entry in the RCB 130 is reserved and a CrdGrant is sent back, as indicated by 136, to the requester to resend the original command back to the completer 104. The RCB 130 also monitors the RQ 120 and when there is additional space available in RQ 120, the RCB 130 communicates, as indicated by 118, a command from the RCB 130 out to the RQ 120. A response multiplexer 150 transmits a response 160 from each of the FIFOs 152, 154, and 156 back to the requester in the coherent fabric 102.

Figure 2:
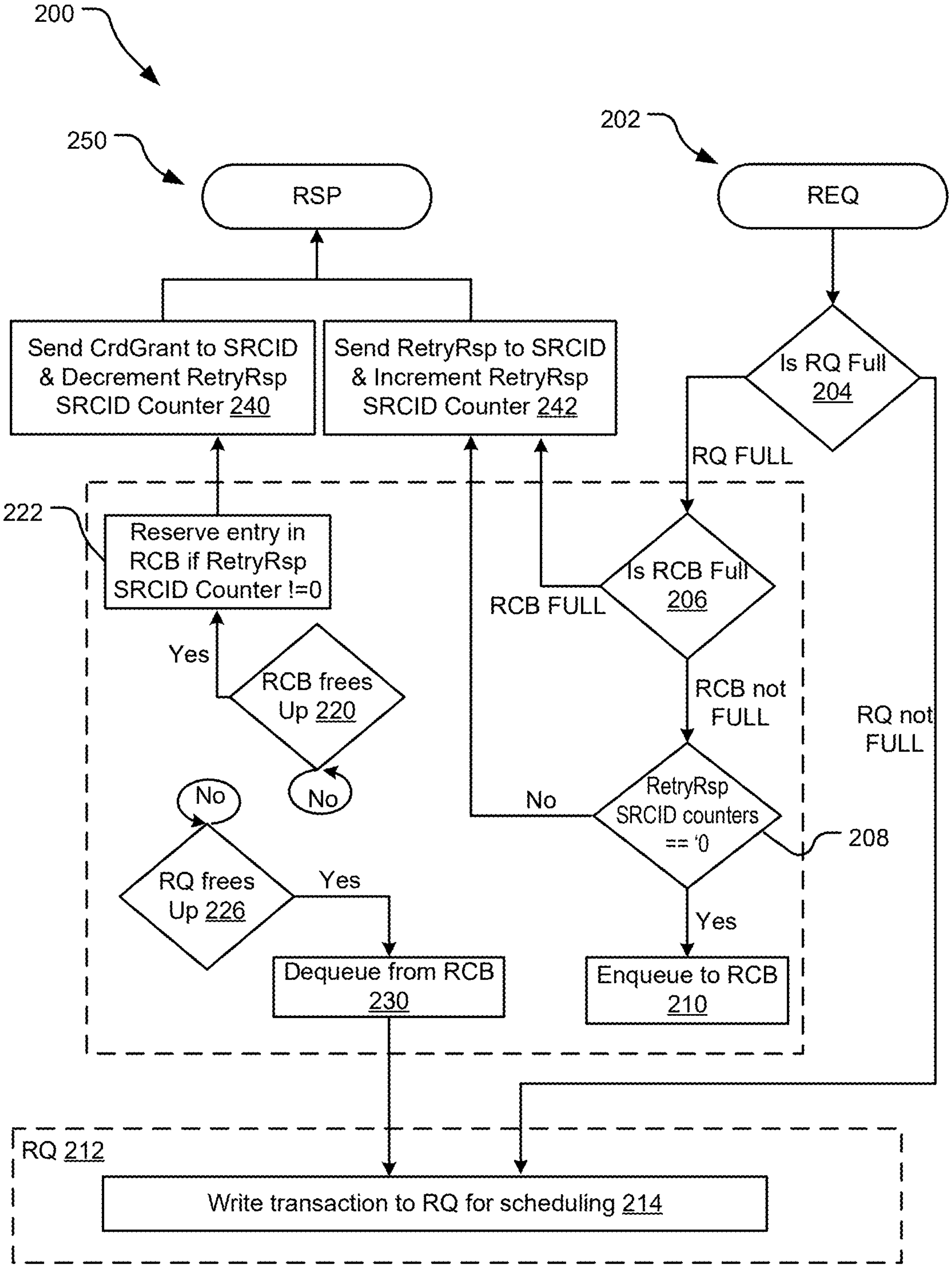
FIG. 2 illustrates an example implementation of operations at a completer for minimizing retries in a coherent fabric.

FIG. 2 illustrates an implementation of operations 200 at a completer for minimizing retries in a coherent fabric. At 202 a new request or a transaction is received by the completer. An operation 204 determines if an RQ 212 is full. If the RQ is not full, the transaction is written 214 to the RQ 212. If the RQ 212 is full and can no longer accept new transactions, then subsequent transactions seen by the completer may be potentially retried because the RQ has no room to process these requests and a RetryRsp may be generated. However, in the illustrated implementation, the completer determines if such transaction can be enqueued into the RCB instead of generating a RetryRsp based on operation 206 which determines if RCB 210 is not full.

If the operation 206 determines that the RCB is not full, a subsequent operation 208 determines if the RetryRsp counters for all source ID (SrcID) are equal to zero. Here the RetryRsp counters for each particular SrcID keeps track of the number of RetryRsps that are sent to that particular source. If the RetryRsp counters for all SrcIDs are zero, indicating that there is no backlog of transactions that were previously not processed/completed for which the completer had sent RetryRsps back to the source the incoming transaction is enqueued into the RCB 210. If the operation 206 determines that the RCB is full, at operation 242 the completer sends a RetryRsp to the source that sent the transaction and increments the RetryRsp counter for the SrcID of that source. Similarly, if the operation 208 determines that the RetryRsp counters for all source ID (SrcID) are not equal to zero, the operation 242 the completer sends a RetryRsp to the source that sent the transaction and increments the RetryRsp counter for the SrcID of that source.

Furthermore, an operation 220 periodically evaluates the RCB 210 to determine if a slot in the RCB 210 is free. For example, this may be the case when a transaction that was previously stored in the RCB 210 is moved to the RQ 212. If it is determined that the RCB 210 has a slot available, at operation 222 the completer first tries to send CrdGrant for any requests it had already sent a RetryRsp in the past, i.e., RetryRsp counter for that source ID is not zero. Operation 240 sends a CrdGrant to the SrcID for which an entry is reserved in the RCB and it decrements the RetryRsp counter for that SrcID. However, If the RetryRsp counters for all the source IDs are 0, then a transaction can be enqueued in the RCB if the RQ is full and not accepting requests.

Another operation 226 periodically evaluates the RQ 212 to determine if resources in the RQ 212 free up and if it can process new requests. If so an operation 230 the new transaction temporarily hosted in the RCB 210 is sent further along to the RQ 212 to be processed.

Thus, in the above implementation, it is only when both the RQ 212 and the RCB 210 run out of space does the completer in fact send back a RetryRsp back to the requester for any new requests seen by the completer. The RCB 212 tracks all the RetryRsp sent back to each requester with a dedicated SrcID counter for each source represented by SrcID. Thus, the SrcID counter increments when a RetryRsp is sent to the requester and decrements when an entry in the RCB 210 is reserved and a CrdGrant is sent back to the requester to resend the original request back to the completer.

Figure 3:
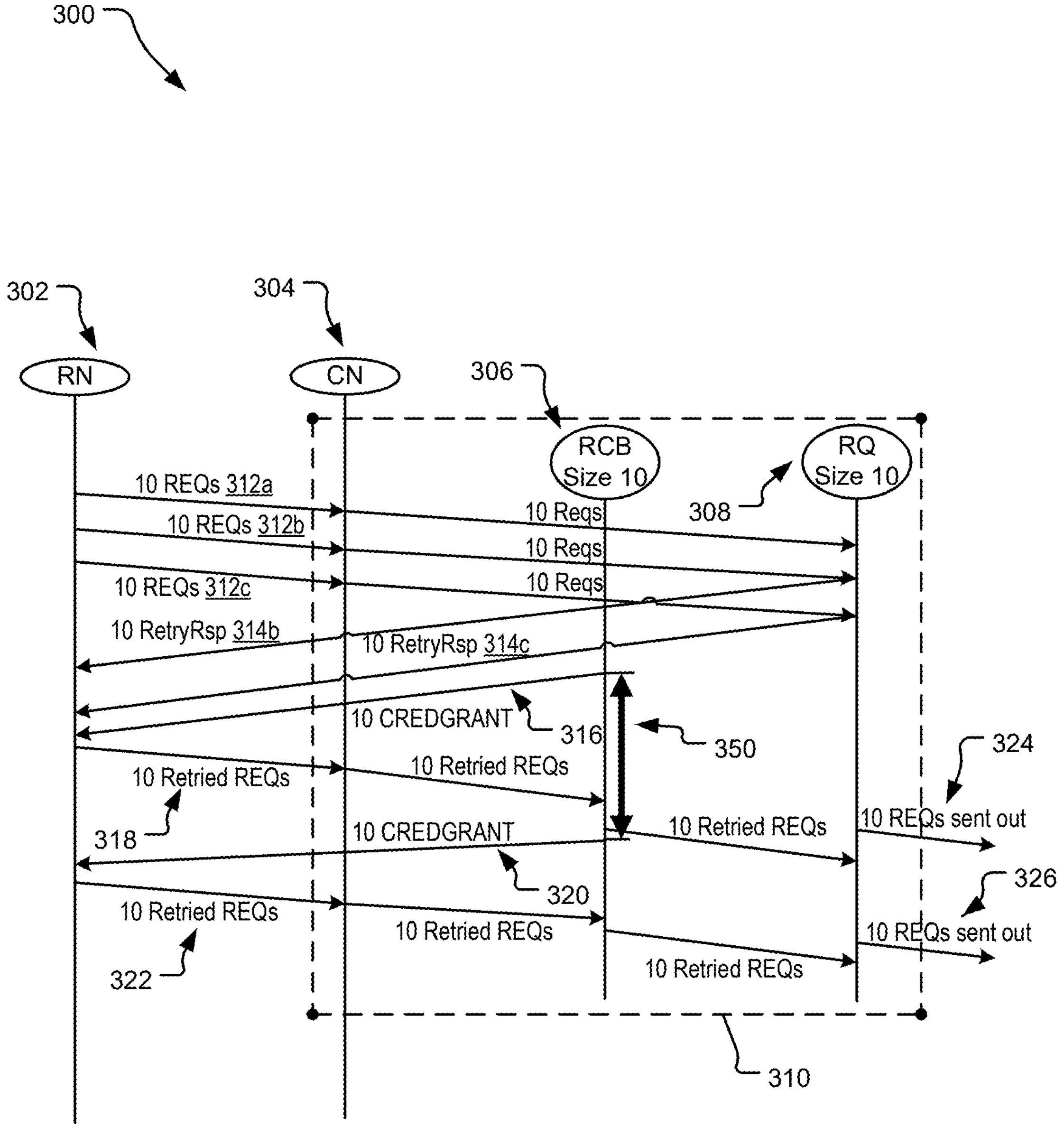
FIG. 3 illustrates an example of transaction flow diagram through the RCB/RQ.

FIG. 3 illustrates an example of transaction flow diagram 300 through the RCB/RQ. The diagram 300 illustrates communications between a requester node (RN) 302, a completer node (CN) 304, an RCB 306, and an RQ 308. The RCB 306 and the RQ 308 each may be configured to have ten (10) transactions stored thereon and each of them may be implemented on a completer 310. Specifically, diagram 300 illustrates the implementation where the RCB 306 is not configured to store one or more transaction requests received at the CN 304 in addition to being used as dedicated storage for one or more transaction requests for which the RN 302 resending the transaction request after receiving a credit grant (CrdGrant) response from the completer CN 304.

As shown herein once the completer 310 runs out of space after processing the first 10 requests 312*a*, the subsequent 20 requests 312*b* results in 20 RetryRsps 314 (314*b* and 314*c*) communicated to the RN 302, Subsequently, when a CrdGrant 316 is communicated to the RN 302 for 10 transactions, the RN 302 communicates back the 10 transactions 318, which are subsequently sent out for processing at 324. This series of transactions are repeated for the second set of ten transactions 312*c* at 320, 322, and 326.

The implementation 300, where the RCB 306 is not configured to store one or more transaction requests received at the CN 304, results in additional penalty incurred due to 20 RetryRsps 314*b*, 314*c* and corresponding 20 CrdGrants 316, 320 sent back to RN 302 from the CN 304. These additional RetryRsps and CrdGrants have to traverse multiple nodes between the CN 304 and the RN 302. As a result, not using the RCB to store one or more transaction requests received at the CN 304 results in very high penalty in terms of additional traffic across the network and related delays.

Figure 4:
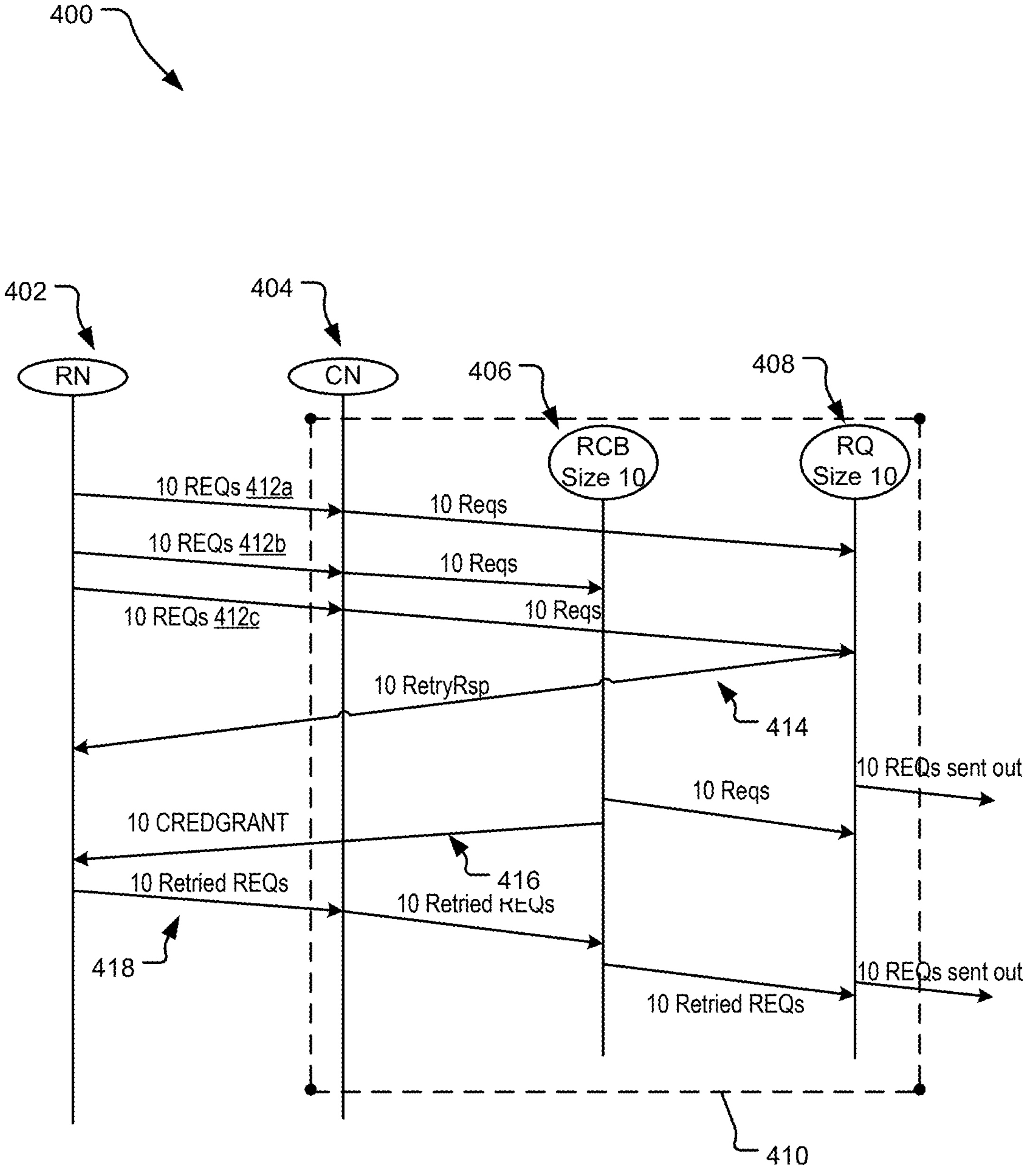
FIG. 4 illustrates an alternative example of transaction flow diagram through the RCB/RQ.

FIG. 4 illustrates an alternative example of transaction flow diagram 400 through the RCB/RQ. Specifically, the diagram 400 illustrates communications between a requester node (RN) 402, a completer node (CN) 404, an RCB 406, and an RQ 408. The RCB 406 and the RQ 408 each may be configured to have ten (10) transactions stored thereon and each of them may be implemented on a completer 410. However, as compared to the diagram 300, the diagram 400 illustrates the implementation where the RCB 406 is configured to store one or more transaction requests received at the CN 404 in addition to being used as dedicated storage for one or more transaction requests for which the RN 402 has been communicated a credit grant (CrdGrant) response.

Specifically, the first 10 requests 412*a* received at the CN 404 are staged in the RQ 408. The subsequent 10 requests 412*b* are stored in the RCB 406. Only when both the RQ 408 and the RCB 406 of the completer 410 are both fully used, the subsequent 10 requests 412*c* elicits RetryRsps 414 from the CN 404. Subsequently, the CN 404 issues CrdGrants 416 to the RN 402, which results in the ultimate processing of the requests 412*c*. Thus, the implementation of the completer 410 results in ten (10) less RetryRsps and CrdGrants to be communicated across the numerous nodes of a coherent fabric, resulting in lower traffic, lower delays, and lower power utilization.

Figure 5:
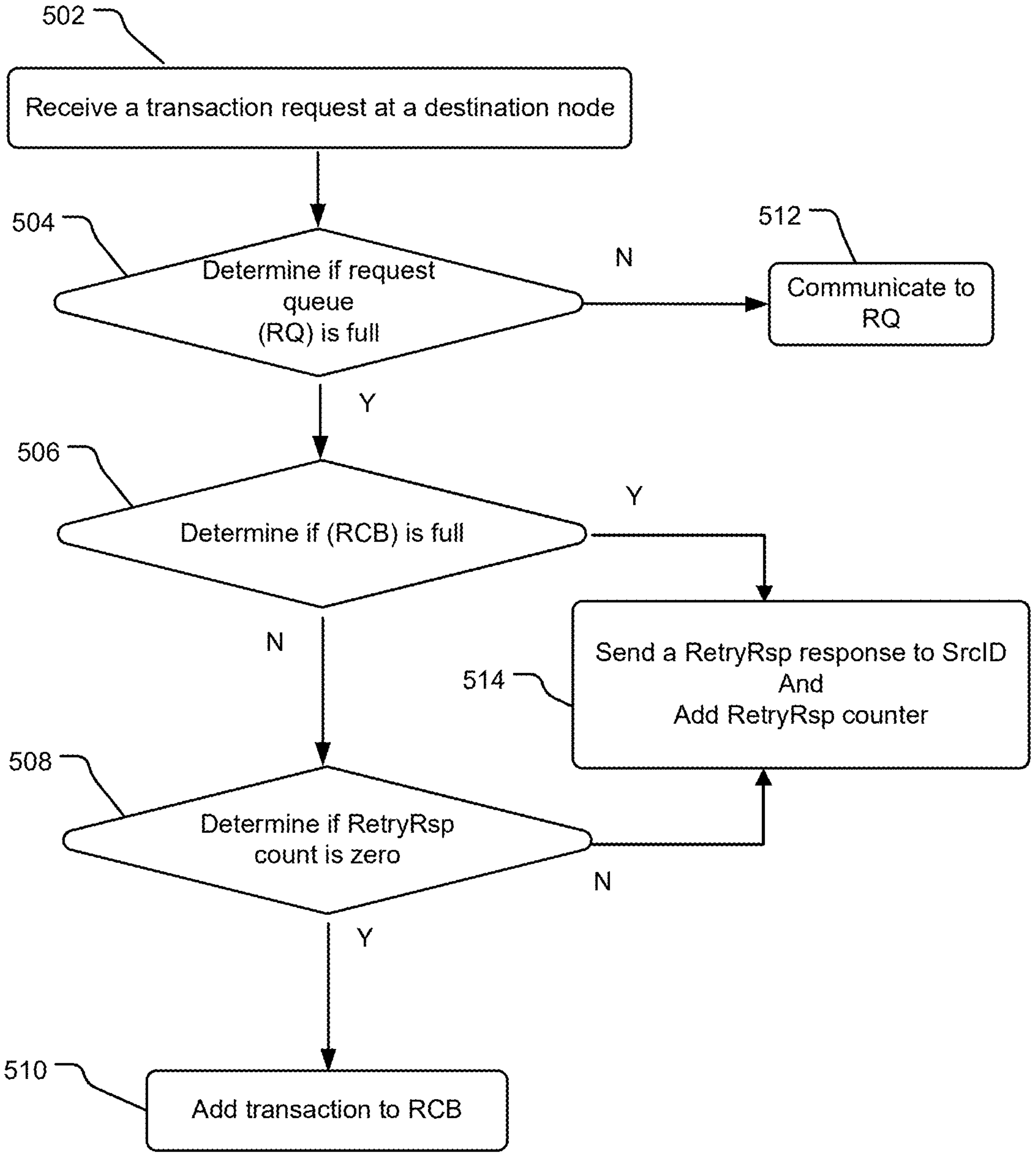
FIG. 5 illustrates an example flowchart of operations in a system for minimizing retries in a coherent fabric disclosed herein.

FIG. 5 illustrates an example flowchart of operations 500 in a system for minimizing retries in a coherent fabric disclosed herein. The operations 500 may be implemented at either a destination node or at a home node (also referred to as a completer node). An operation 502 receives a transaction request at a destination node of a fabric. An operation 504 determines if an RQ at the completer is full by determining the number of empty spaces in the RQ of the completer or destination node. If the RQ is full, in that the number of empty spaces in RQ is zero, an operation 506 determines the number of empty spaces in the RCB. In response to determining that the RCB is not full, an operation 508 determines the number of backlogged transaction requests (RetryRsp count) in a RetryRsp counter. In response to determining that the RetryRsp count is zero, an operation 510 adds the incoming transaction request to the RCB.

If the operation 504 determines that the number of empty spaces in the RQ is not zero, indicating that the RQ is capable of taking the new transaction, an operation 512 communicates the new transaction received at the completer to the RQ for further processing. Similarly, if the operation 506 determines that the RCB is full, an operation 514 sends a RetryRsp response to a source and increments the RetryRsp counter for that source.

Figure 6:
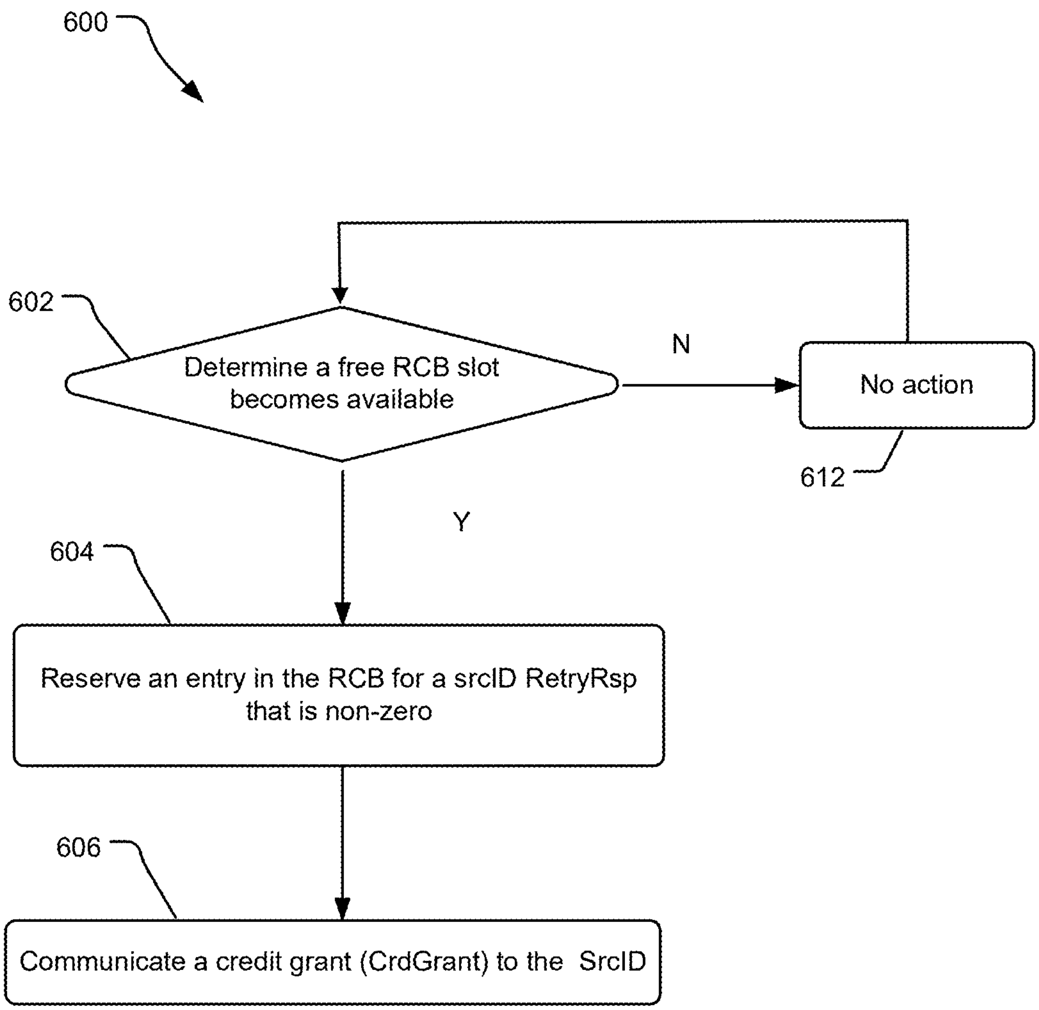
FIG. 6 illustrate an alternative example flowchart of operations in a system for minimizing retries in a coherent fabric disclosed herein.

FIG. 6 illustrates an alternative example flowchart of operations 600 in a system for minimizing retries in a coherent fabric disclosed herein. Here an operation 602 determines if a free RCB slot becomes available, and in response to determining that a free RCB slot becomes available, an operation 604 reserves an entry in the RCB for a source node (SrcID) RetryRsp counter that is nonzero and an operation 606 communicates a CrdGrant back to the source. However, if the operation 602 determines that a free RCB slot has not become available, as per operation 612 no action is taken.

Figure 7:
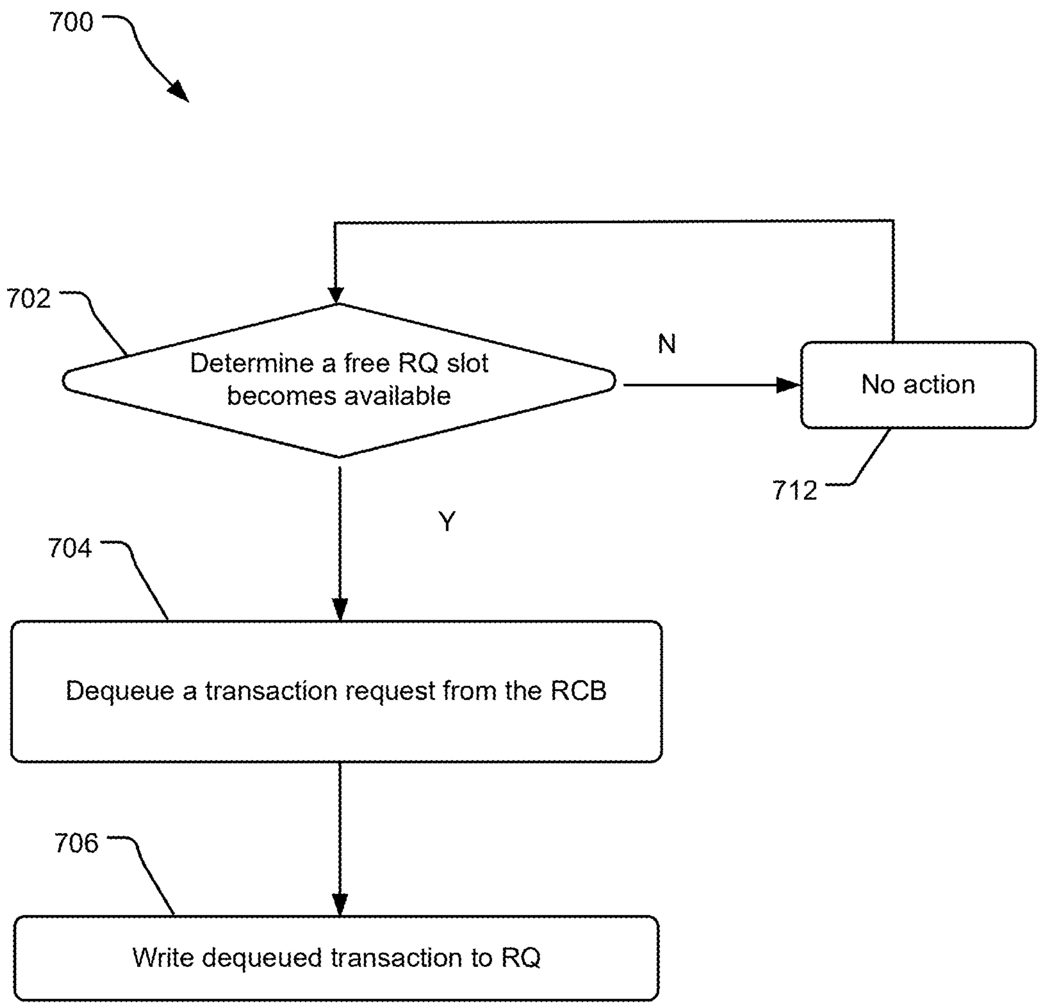
FIG. 7 illustrate another alternative example flowchart of operations in a system for minimizing retries in a coherent fabric disclosed herein.

FIG. 7 illustrates another alternative example flowchart of operations 700 in a system for minimizing retries in a coherent fabric disclosed herein. Here an operation 702 determines if a free RQ slot becomes available. In response to determining that a free RQ slot becomes available, an operation 704 dequeues a transaction request from the RCB to the RQ and an operation 706 writes the dequeued transaction to the RQ. However, if the operation 702 determines that a free RQ slot has not become available, as per operation 712 no action is taken.

Figure 8:
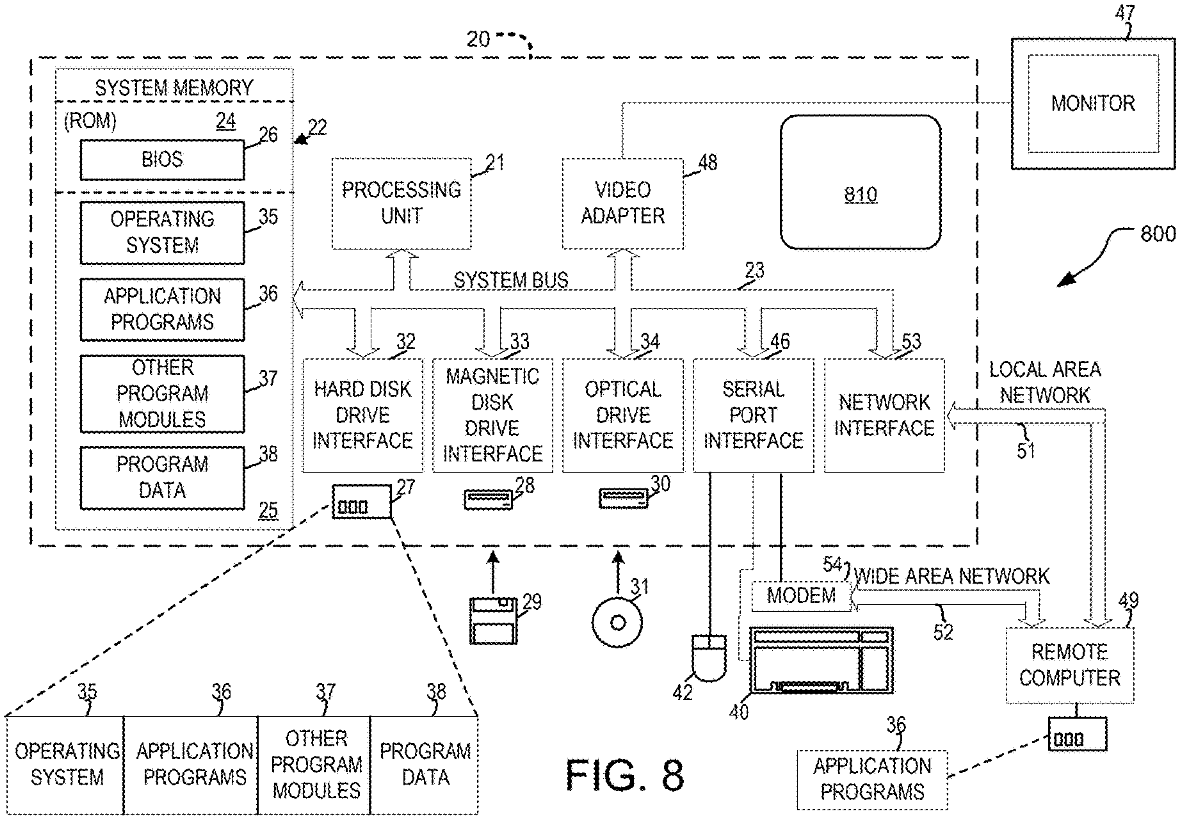
FIG. 8 illustrates an example system that may be useful in implementing the collaboration network mining technology disclosed herein.

FIG. 8 illustrates an example system 800 that may be useful in implementing the system for providing forward and reverse mapping between physical address and DRAM address disclosed herein. The example hardware and operating environment of FIG. 8 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 8. Similarly, instructions stored on the memory of the computer 20 may also be used to implement one or more operations of FIG. 1. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 8 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the system 810 for minimizing retries in a coherent fabric may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

A method disclosed herein includes receiving a transaction request at a destination node of a fabric, determining a number of empty spaces in a request queue (RQ) of the destination node, in response to determining that the number of empty spaces in the RQ is zero, determining a number of empty spaces in a retry command buffer (RCB), in response to determining that the RCB is not full, determining a number of backlogged transaction requests (RetryRsp count) in a RetryRsp counter, and in response to determining that the RetryRsp count is zero, adding the transaction request to the RCB.

One or more physically manufactured computer-readable storage media, encoding computer-executable instructions for executing on a computer system a computer process, the computer process includes receiving a transaction request at a destination node of a fabric, determining a number of empty spaces in a request queue (RQ) of the destination node, in response to determining that the number of empty spaces in the RQ is zero, determining a number of empty spaces in a retry command buffer (RCB), in response to determining that the RCB is not full, determining a number of backlogged transaction requests (RetryRsp count) in a RetryRsp counter, and in response to determining that the RetryRsp count is zero, adding the transaction request to the RCB.

A system disclosed herein includes memory, one or more processing units, and a retry minimization system stored in the memory and executable by the one or more processor units, the retry minimization system encoding computer-executable instructions on the memory for executing on the one or more processor units a computer process, the computer process including receiving a transaction request at a destination node of a fabric, determining a number of empty spaces in a request queue (RQ) of the destination node, in response to determining that the number of empty spaces in the RQ is zero, determining a number of empty spaces in a retry command buffer (RCB), in response to determining that the RCB is not full, determining a number of backlogged transaction requests (RetryRsp count) in a RetryRsp counter, and in response to determining that the RetryRsp count is zero, adding the transaction request to the RCB.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:

receiving a transaction request at a destination node of a fabric;

determining a number of empty spaces in a request queue (RQ) of the destination node;

in response to determining that the number of empty spaces in the RQ is zero, determining a number of empty spaces in a retry command buffer (RCB);

in response to determining that the RCB is not full, determining a number of backlogged transaction requests (RetryRsp count) in a RetryRsp counter; and in response to determining that the RetryRsp count is zero, adding the transaction request to the RCB.

2. The method of claim 1, further comprising:

in response to determining that the RCB is full, sending a RetryRsp response to a source node (SrcID) of the transaction request, and incrementing, in the RetryRsp counter, an individual RetryRsp counter for the SrcID.

3. The method of claim 1, further comprising:

in response to determining that the RetryRsp count is not zero, sending a RetryRsp response to a source node (SrcID) of the transaction request, and incrementing, in the RetryRsp counter, an individual RetryRsp counter for the SrcID.

4. The method of claim 1, further comprising:

determining that a free RCB slot becomes available; and in response to determining that the free RCB slot becomes available, reserving the free RCB slot for a transaction request from a source node (SrcID) associated with an individual RetryRsp counter in the RetryRsp counter.

5. The method of claim 4, further comprising communicating a credit grant (CrdGrant) to the SrcID.

6. The method of claim 1, further comprising:

determining that a free RQ slot becomes available; and in response to determining that the free RQ slot becomes available, dequeuing a transaction request from the RCB.

7. The method of claim 6, further comprising writing the dequeued transaction request to the RQ.

8. The method of claim 1, wherein the RCB comprises:

dedicated storage for one or more transaction requests for which a source node (SrcID) sending the one or more transaction requests has been communicated a credit grant (CrdGrant) response; and one or more new transaction requests received at the destination node.

9. One or more physically manufactured computer-readable storage media, encoding computer-executable instructions for executing on a computer system a computer process, the computer process comprising:

receiving a transaction request at a destination node of a fabric;

determining a number of empty spaces in a request queue (RQ) of the destination node;

in response to determining that the number of empty spaces in the RQ is zero, determining a number of empty spaces in a retry command buffer (RCB);

in response to determining that the RCB is not full, determining a number of backlogged transaction requests (RetryRsp count) in a RetryRsp counter; and in response to determining that the RetryRsp count is zero, adding the transaction request to the RCB.

10. The one or more physically manufactured computer-readable storage media of claim 9, wherein the computer process further comprises, in response to determining that the RCB is full:

sending a RetryRsp response to a source node (SrcID) of the transaction request, and incrementing, in the RetryRsp counter, an individual RetryRsp counter for the SrcID.

11. The one or more physically manufactured computer-readable storage media of claim 9, wherein the computer process further comprises, in response to determining that the RetryRsp count is not zero:

sending a RetryRsp response to a source node (SrcID) of the transaction request, and incrementing, in the RetryRsp counter, an individual RetryRsp counter for the SrcID.

12. The one or more physically manufactured computer-readable storage media of claim 9, wherein the computer process further comprisingcomprises:

determining that a free RCB slot becomes available; and in response to determining that the free RCB slot becomes available, reserving the free RCB slot for a transaction request from a source node (SrcID) associated with an individual RetryRsp counter in the RetryRsp counter.

13. The one or more physically manufactured computer-readable storage media of claim 12, wherein the computer process further comprises communicating a credit grant (CrdGrant) to the SrcID.

14. The one or more physically manufactured computer-readable storage media of claim 10, wherein the computer process further comprises:

determining that a free RQ slot becomes available; and in response to determining that the free RQ slot becomes available, dequeuing a transaction request from the RCB.

15. The one or more physically manufactured computer-readable storage media of claim 9, wherein the RCB comprises:

dedicated storage for one or more transaction requests for which a source node (SrcID) sending the one or more transaction requests has been communicated a credit grant (CrdGrant) response; and one or more new transaction requests received at the destination node.

16. A system comprising:

memory;

one or more processing units; and a retry minimization system stored in the memory and executable by the one or more processing units, the retry minimization system encoding computer-executable instructions on the memory for executing on the one or more processing units a computer process, the computer process comprising:

receiving a transaction request at a destination node of a fabric;

determining a number of empty spaces in a request queue (RQ) of the destination node;

in response to determining that the number of empty spaces in the RQ is zero, determining a number of empty spaces in a retry command buffer (RCB);

in response to determining that the RCB is not full, determining a number of backlogged transaction requests (RetryRsp count) in a RetryRsp counter; and in response to determining that the RetryRsp count is zero, adding the transaction request to the RCB.

17. The system of claim 16, wherein the computer process further comprising: defining one or more virtual register functions, wherein the virtual register function, when executed on the virtual register, performs the virtual register function on each register of the group of registers.

18. The system of claim 17, wherein the computer process further comprising, in response to determining that the RCB is full:

sending a RetryRsp response to a source node (SrcID) of the transaction request, and adding a RetryRsp counter for the SrcID to the RetryRsp counter.

19. The system of claim 17, wherein the computer process further comprising:

determining that a free RCB slot becomes available; and in response to determining that a free RCB slot becomes available, adding a transaction request from a source node (SrcID) related to a RetryAct counter in the RetryRsp counter to the RCB.

20. The system of claim 17, wherein the RCB is configured to store:

dedicated storage for one or more transaction requests for which a source node (SrcID) sending the transaction request has been communicated a credit grant (CrdGrant) response; and one or more new transaction requests received at the destination node.

* * * * *